(12) United States Patent
Iturrospe Iregui

(10) Patent No.: US 11,852,612 B2
(45) Date of Patent: Dec. 26, 2023

(54) METHOD FOR NON-DESTRUCTIVE INSPECTION OF PARTS

(71) Applicant: PROMOCION Y DESARROLLO DE SISTEMAS AUTOMATICOS S.L.U., Gipuzkoa (ES)

(72) Inventor: Aitzol Iturrospe Iregui, Eskoriatza (ES)

(73) Assignee: PROMOCION Y DESARROLLO DE SISTEMAS AUTOMATICOS S.L.U., Gipuzkoa (ES)

( * ) Notice: Subject to any disclaimer, the term of this patent is extended or adjusted under 35 U.S.C. 154(b) by 600 days.

(21) Appl. No.: 17/108,127

(22) Filed: Dec. 1, 2020

(65) Prior Publication Data

US 2021/0080432 A1   Mar. 18, 2021

Related U.S. Application Data

(63) Continuation of application No. PCT/ES2018/070842, filed on Dec. 28, 2018.

(30) Foreign Application Priority Data

Jun. 1, 2018   (EP) ..................................... 18175460

(51) Int. Cl.
*G01N 29/44* (2006.01)
*G01N 29/34* (2006.01)

(52) U.S. Cl.
CPC ....... *G01N 29/4472* (2013.01); *G01N 29/348* (2013.01); *G01N 2291/105* (2013.01)

(58) Field of Classification Search
None
See application file for complete search history.

(56) References Cited

U.S. PATENT DOCUMENTS

| 5,327,358 A | 7/1994 | Stubbs |
| 5,493,511 A | 2/1996 | Wincheski |
| 5,886,263 A | 3/1999 | Nath |
| 9,157,788 B2 * | 10/2015 | Hunter ............... G01N 29/2418 |
| 2009/0204355 A1 * | 8/2009 | Vold ...................... G01M 7/025 |
| | | 702/108 |

(Continued)

OTHER PUBLICATIONS

Extended European Search Report received in EP application No. 18175460.7, dated Oct. 4, 2018 (5 pages).

(Continued)

*Primary Examiner* — Jennifer Bahls
(74) *Attorney, Agent, or Firm* — Edell, Shapiro & Finnan, LLC

(57) ABSTRACT

Methods for non-destructive inspection of parts for obtaining the properties and characteristics of the material of a part are disclosed. According to one embodiment, a method for non-destructive inspection of parts includes a step of creating a mathematical model describing the dynamic behavior of a part to be inspected, a step of exciting the part, and a step of measuring the vibratory response of the part. The method further includes a step of optimizing surrounding conditions, a step of selecting modal shapes and a step of selecting at least one excitation point with the excitation orientation and at least one measurement point with the measurement orientation which are performed in that order after the step of creating the mathematical model.

20 Claims, 1 Drawing Sheet

(56) References Cited

U.S. PATENT DOCUMENTS

2013/0110476 A1* 5/2013 Delvaux ................. G01M 7/00
                                                                703/2
2017/0138906 A1    5/2017 Hartwig

OTHER PUBLICATIONS

International Search Report and Written Opinion received in international application No. PCT/ES2018/070842, dated May 13, 2019 (15 pages).

* cited by examiner

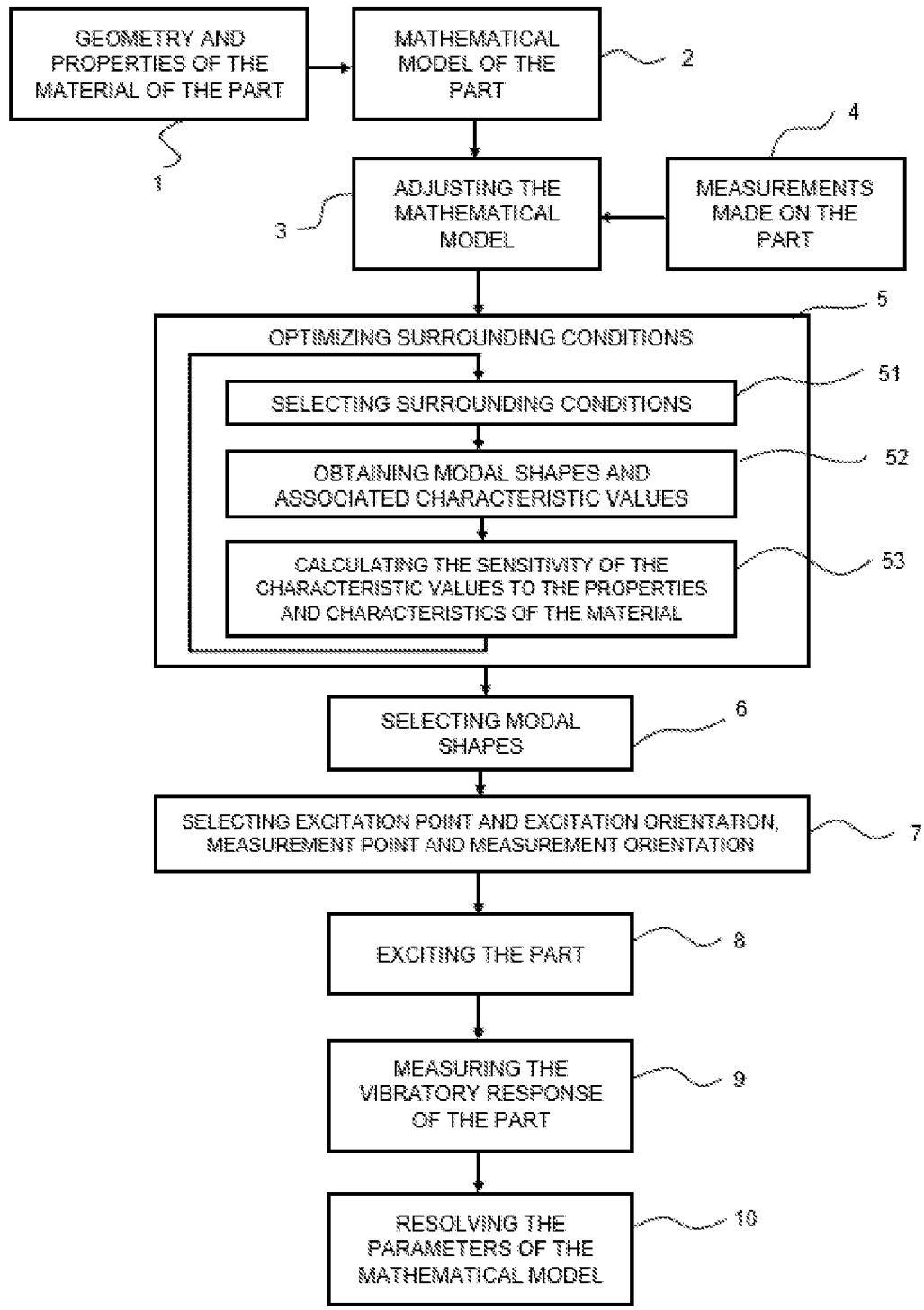

METHOD FOR NON-DESTRUCTIVE INSPECTION OF PARTS

CROSS-REFERENCE TO RELATED APPLICATIONS

This application relates to and claims the benefit and priority to International Appl. No. PCT/ES2018/070842, filed Dec. 28, 2018, which claims the benefit and priority to European Appl. No. EP18175460.7, filed Jun. 1, 2018.

TECHNICAL FIELD

The present invention relates to methods and devices for non-destructive inspection of parts.

BACKGROUND

Methods and devices for non-destructive inspection of parts are known. Non-destructive inspection of parts can be useful, for example, to perform periodic maintenance of parts already installed in a machine, or to validate parts obtained from a manufacturing process.

U.S. Pat. No. 5,886,263 describes a method and a device for non-destructive inspection based on ultrasound. The method comprises a first step in which a finite element model of a part is created based on its geometry and the properties of its material. Next, the method predicts resonant frequencies based on said finite element model. The method subsequently adjusts the finite element model based on empirical data, thereby obtaining a validated finite element model. The method then experimentally measures the resonant frequencies of a part once it has been manufactured, and compares the experimental resonant frequencies with those obtained by means of analyzing the finite element model, storing the comparative data in a memory. The method performs the preceding inspection at maintenance intervals, comparing the data obtained in each inspection with the resonant frequencies of a well-made part, subsequently indicating if it is a well-made or poorly-made part based on the deviations between both.

SUMMARY

Disclosed is a method for non-destructive inspection of parts.

The method for non-destructive inspection allows obtaining the properties and characteristics of the material of a part in the entire geometry thereof, i.e., both on the surface of the part and on the inside thereof.

The method comprises a first step of creating a mathematical model describing the dynamic behavior of a part to be inspected taking into account the geometry of the part to be inspected and the properties of the material at the different points of the part to be inspected represented by means of a set of parameters.

The method for non-destructive inspection further comprises a step of exciting the part to be inspected at least one excitation point of the part to be inspected and with an excitation orientation, and a step of measuring the vibratory response of the part to be inspected at least one measurement point and with a measurement orientation.

The method for non-destructive inspection is characterized in that it further comprises a step of optimizing surrounding conditions which is performed after the step of creating the mathematical model.

In the step of optimizing surrounding conditions, there are performed in an iterative manner the sub-steps of selecting surrounding conditions, then the sub-step of obtaining modal shapes and characteristic values associated with said modal shapes for the surrounding conditions previously selected in the preceding sub-step, and a last sub-step of calculating the sensitivity of the characteristic values obtained in the preceding sub-step of the same iteration to the properties and characteristics of the material of the part, for the surrounding conditions selected in the sub-step of selecting surrounding conditions of the same iteration.

The method for non-destructive inspection further comprises a step of selecting modal shapes which is performed after the step of optimizing surrounding conditions, in which the combinations of surrounding conditions and modal shapes for which the sensitivity of the characteristic values to the properties and characteristics of the material of the part is maximum are selected.

The method for non-destructive inspection comprises a step of selecting at least one excitation point with the excitation orientation and at least one measurement point with the measurement orientation depending on the modal shapes selected in the step of selecting modal shapes, the step of exciting the part then being started.

The method for non-destructive inspection allows determining the properties and characteristics of the material both on its surface and at any point of its internal geometry by means of using a mathematical model. In a preferred embodiment of the method for inspection of the invention, the mathematical method is a linear mathematical method.

The method allows precisely determining the presence or absence of a fault in any region of the geometry of the part, and characterizing the material in the region in which the fault has occurred, identifying the properties and characteristics of the material in said region. The method allows graphically representing the properties and characteristics of the material in three dimensions, preferably by means of tomographies.

The method for non-destructive inspection allows obtaining the properties and characteristics of the material of the part in the entire geometry thereof in a shorter time than the methods for non-destructive inspection known in the prior art because, in the method, surrounding conditions are selected, a set of modal shapes is selected based on the mathematical model and on the previously selected surrounding conditions, and the excitation point, the excitation orientation, the measurement point, and the measurement orientation in which the non-destructive inspection of the part will be carried out are also selected.

These and other advantages and features will become evident in view of the drawings and detailed description.

BRIEF DESCRIPTION OF THE DRAWINGS

FIG. 1 shows a flow chart of the steps of an embodiment of a method for non-destructive inspection.

DETAILED DESCRIPTION

FIG. 1 shows in a flow chart the steps of A method for non-destructive inspection of parts for obtaining the properties of the material of a part in the entire geometry thereof.

The method for non-destructive inspection of parts comprises a first step of creating a mathematical model describing the dynamic behavior of a part to be inspected taking into account the geometry of the part to be inspected and the properties of the material at the different points of the part to be inspected represented by means of a set of parameters, as shown in blocks 1 and 2 of FIG. 1.

The method for non-destructive inspection further comprises a step of exciting the part to be inspected at at least one excitation point of the part to be inspected and with an excitation orientation, as shown in block 8 of FIG. 1. The method for non-destructive inspection then comprises a step of measuring the vibratory response of the part to be inspected at at least one measurement point and with a measurement orientation, as shown in block 9 of FIG. 1.

The method for non-destructive inspection is characterized in that it further comprises a step of optimizing surrounding conditions which is performed after the step of creating the mathematical model, as shown in block 5 of FIG. 1.

In the step of optimizing surrounding conditions, there are performed in an iterative manner the sub-steps of selecting surrounding conditions, then the sub-step of obtaining modal shapes and characteristic values associated with said modal shapes for the surrounding conditions previously selected in the preceding sub-step of the same iteration, and then a last sub-step of calculating the sensitivity of the characteristic values obtained in the preceding sub-step of the same iteration to the properties and characteristics of the material in the entire geometry of the part or in a portion of the part, for the surrounding conditions selected in the sub-step of selecting surrounding conditions of the same iteration, as shown in blocks 51, 52, and 53 of FIG. 1.

In a preferred embodiment, calculating the sensitivity of the characteristic values associated with the modal shapes will result in a vector of sensitivity for each characteristic value, in which each element of the vector is the partial derivative of the characteristic value associated with the modal shape with respect to a local property of the material or to a local characteristic of the material of the part, such as the internal stresses of that material. A local property of the material of the part is considered to be the property of the material at a specific point of the part. Similarly, a local characteristic of the material of the part is considered to be the characteristic of the material at a specific point of the part.

The method allows focusing the inspection on one or more specific regions or volumes of interest of the geometry of the part. Depending on the regions or volumes to be considered in the inspection, in each iteration, in the sub-step of selecting surrounding conditions, the method selects the surrounding conditions most suitable for the identification of the properties and characteristics of the material of the part in said regions. Once the surrounding conditions are selected, the modal shapes, their natural frequencies, and the characteristic values associated with said modal shapes for the surrounding conditions selected in the preceding sub-step of said iteration will be obtained from the mathematical model. Finally, for the selected surrounding conditions and for each of the modal shapes obtained in the preceding sub-steps of said iteration, the sensitivity of the obtained characteristic values to the properties and characteristics of the material in the entire part or in the regions or volumes to be considered in the inspection, for the previously selected surrounding conditions, will be calculated.

In the first performance of the sub-steps of the step of optimizing surrounding conditions, the method will select first surrounding conditions, subsequently obtaining the modal shapes associated with the first surrounding conditions, and finally calculating the sensitivity of the characteristic values associated with said modal shapes to the properties and characteristics of the material. In a second performance of the sub-steps of the step of optimizing surrounding conditions of the method, the method will select second surrounding conditions, subsequently obtaining the modal shapes associated with the second surrounding conditions, and finally calculating the sensitivity of the characteristic values associated with the modal shapes associated with the second surrounding conditions to the properties and characteristics of the material. The iterative performance of the preceding sub-steps will be carried out as many times as necessary in order to obtain optimum surrounding conditions and modal shapes for the inspection.

The method comprises a step of selecting modal shapes which is performed after the step of optimizing surrounding conditions, as shown in block 6 of FIG. 1. In the step of selecting modal shapes, the combinations of surrounding conditions and modal shapes for which the sensitivity of the characteristic values to the properties and characteristics of the material of the part is maximum are selected, the characteristic values for which the sensitivity is calculated corresponding to each combination of surrounding conditions and modal shapes.

In a preferred embodiment, the method for inspection minimizes the number of modes necessary to reach the required spatial resolution, preferably by means of a principal component analysis. A mode is considered to be the combination of a modal shape with its associated characteristic value. Selection is performed among all the combinations of surrounding conditions and modal shapes obtained in the step of optimizing surrounding conditions, as shown in block 6 of FIG. 1.

The method for non-destructive inspection comprises a step of selecting at least one excitation point with the excitation orientation and at least one measurement point with the measurement orientation, as shown in block 7 of FIG. 1, the step of exciting the part then being started. The selection of at least one excitation point with the excitation orientation and at least one measurement point with the measurement orientation is performed depending on the modal shapes selected in the step of selecting modal shapes.

In a preferred embodiment, the CAD of the part to be inspected will be used to provide the mathematical model with information concerning the geometry of the part to be inspected.

In a preferred embodiment, the mathematical model will be a finite element model (FEM). The mathematical model will describe, by means of a plurality of mathematical equations, the dynamic behavior of the part to be inspected. In said equations, the mathematical model will use a plurality of parameter value matrices, such that each parameter value matrix will represent one of the properties of the material in the geometry of the part. The properties of the material represented by means of each of said parameters comprise, among others, the mass, stiffness, and damping at the different points of the part. The characteristics of the material, though not obtained directly from the parameters of the mathematical model, are indeed derived from said parameters. The characteristics of the material comprise the internal stresses of the material in different directions at the different points of the part.

The internal stresses of the material of the part to be inspected can be determined by means of the method, entailing an advantage with respect to methods for non-destructive inspection known in the prior art.

In a preferred embodiment, the excitation will be a frequency sweep which mechanically excites the part in the acoustic range and/or in the ultrasound range, although in other embodiments, the excitation could be an impact or a white noise. The frequency sweep will comprise the natural frequencies associated with the modal shapes selected in the step of selecting modal shapes of the method of the invention. In another embodiment of the method for inspection of the invention, the excitation could be any type of excitation with a sufficient bandwidth comprising the natural frequencies of interest.

In block 10 of FIG. 1, the method comprises, after the step of measuring, a step of resolving the parameters of the mathematical model in which the properties and characteristics of the material of the part in the entire geometry thereof are obtained depending on the differences between the vibratory response of the part obtained in the step of measuring and the response provided by the mathematical model with the same excitation points and excitation orientations, and the same measurement points and measurement orientations, and with the same surrounding conditions. The values of the parameter value matrices of the mathematical model are obtained in the step of resolving the parameters of the mathematical model, therefore determining the properties of the material in the geometry of the part. The characteristics of the material in the geometry of the part are derived from the parameters of the mathematical model.

In a preferred embodiment, a system of linear equations linking the variation of the characteristic values to the change in the local properties or characteristics of the part is obtained for a linear model. In said system of equations, the unknown parameters are the values of the local properties and characteristics of the material in the geometry of the part.

In another embodiment, the system of equations is indeterminate. In this embodiment, the unknown parameters of the system of equations are optimized using constrained optimization methods, preferably compressive testing methods.

In a preferred embodiment, the parameters of the mathematical model represent the mass, stiffness, damping, and/or internal stresses of the material of the part.

In a preferred embodiment, the surrounding conditions comprise holding the part in a portion of its geometry.

In another embodiment, the surrounding conditions comprise the application of a force on one or more points of the geometry of the part.

In a preferred embodiment, the method comprises a step of adjusting the mathematical model based on empirical data obtained from measurements performed on valid parts, obtaining a validated mathematical model, which is performed after the step of creating the mathematical model, as shown in blocks 3 and 4 of FIG. 1.

A valid part is considered to be that part the material of which has the expected properties and characteristics, i.e., those corresponding to a part manufactured without errors. However, a non-valid, erroneous, or faulty part is considered to be that part the material of which has properties or characteristics which are unexpected, in either the entire volume of the part or in a specific region of the part, or on the surface or the inside thereof.

When the inspection is not performed as validation of the part following its manufacture, but rather as part of its maintenance, a valid part is considered to be that part the material of which does not have modified properties and characteristics due to use. However, a non-valid, erroneous, or faulty part is considered to be that part the material of which does have modified properties and characteristics due to use, either in the entire volume of the part or in a specific region of the part, or on the surface or the inside thereof.

Before performing measurements on valid parts of block 3 of FIG. 1, it must be verified that said parts have both the geometry and the precise properties and characteristics of the material corresponding to a valid part. Subsequently, in block 4 of FIG. 1, the measurements obtained in block 3 of FIG. 1 are compared with the estimations provided by the mathematical model, reconciling both and thereby obtaining a validated mathematical model. The obtained measurements and the estimations provided by the mathematical model to be compared must be done with the same surrounding conditions, for an excitation caused at the same excitation point and in the same direction, and measured at the same measurement point and with the same direction.

In a preferred embodiment, the properties and characteristics of the material of the inspected part are graphically represented by means of tomography. By means of tomography, the method of the invention identifies, locates, and characterizes the fault or faults in the inspected part, indicating where they are and their magnitude, based on deviations in the measured frequency response with respect to the response provided by the validated mathematical model.

In a preferred embodiment, a tool which allows holding the part in a portion of its geometry, and/or the application of a force on one or more points of the geometry of the part, will be used. The tool will make it easier exciting the part at at least one excitation point with an excitation orientation and the measurement of the vibratory response of the part at at least one measurement point and with a measurement orientation. The tool can be an adaptive and automated tool. In a preferred embodiment, automation would be performed by means of using orientable robot arms.

In a preferred embodiment, the mathematical model only resolves the value of one or more of the parameters of the validated mathematical model, considering the value of the rest of the parameters of the validated mathematical model as known. At times, it is of interest to only obtain the value of one or more of the properties or characteristics of the material of the part, i.e., it is of interest to only obtain the value of one or more of the parameters of the mathematical model, given that the process of manufacturing the part produces parts in which certain properties and characteristics of the material of the part are correct, and the possible faults are concentrated on certain other properties and/or characteristics of the part. Other times, it is the use of the part which causes certain properties and/or characteristics of the material of the part to not be altered, only some of the properties and/or characteristics of that part being altered. Knowing the value of some of the parameters of the validated mathematical model allows shortening the time of performing the method, given that only the value of part of the parameters of the validated mathematical model must be obtained.

In a preferred embodiment, the surrounding conditions are dynamic conditions. In the presence of an excitation caused at one and the same excitation point and excitation direction, one and the same measurement point and measurement direction, the vibratory response of the part changes under dynamic surrounding conditions. The use of different surrounding conditions allows performing several measurements with an excitation caused at one and the same excitation point and excitation direction, one and the same measurement point and measurement direction, providing the method with more information when resolving the value of the parameter value matrices in the system of equations of the mathematical model, which allows a shorter time for performing the method and a higher precision of the values obtained for the parameters of the mathematical model.

In a preferred embodiment, the mathematical model is linear. In a preferred embodiment, the mathematical model is a finite element model.

In a preferred embodiment, the mathematical model describes, by means of a plurality of mathematical equations, the dynamic behavior of the part to be inspected, the mathematical model using a plurality of parameter value matrices, and each parameter value matrix representing one of the properties of the material in the geometry of the part.

In a preferred embodiment, the excitation used in the step of exciting the part is a frequency sweep which mechanically excites the part in the acoustic range and/or in the ultrasound range.

The method can be implemented with a device for non-destructive inspection comprising information processing means, information storage media, and information input and output interfaces. The mathematical model is created and the steps of the method are performed by the processing means. To that end, the processing means uses the information stored in the information storage media, or the information provided through the input interfaces. The information provided by the method for inspection is stored in the storage means, and is graphically represented by means of the output interfaces.

The measurements of the vibratory response of the part obtained in the step of measuring can be sent directly to the device for non-destructive inspection in the case in which the frequency signal receiver is directly connected to said device, or through a communications network, which allows the inspection of the part to be performed in a location remote from the location in which the processing of said measurements is performed.

Similarly, the information required for graphically representing the properties and characteristics of the material of the inspected part can be sent directly to an output interface, or to an interface remotely located, through a data communication network.

The graphical representation can be done by means of tomography or by means of another type of representation known in the prior art which allows locating, quantifying, and characterizing, in the geometry of the part, the fault or faults existing therein.

The invention also refers to an additive manufacturing method of parts in which the method for non-destructive inspection of the invention is applied. Thus, the additive manufacturing method of the invention comprises at least one step of testing the part to be manufactured in which the method for non-destructive inspection of the invention is used.

The additive manufacturing method preferably comprises a plurality of manufacturing phases, so that there is a step of testing after each manufacturing phase. The geometry of the part to be manufactured by additive manufacturing changes as its manufacturing advances, so that at the end of each of the manufacturing phases of the part to be manufactured, the geometry of the part to be manufactured is a determined geometry, and different from the one at the previous phase. In this way, the manufacturing method allows a continuous monitoring of the manufacturing process.

The additive manufacturing method preferably comprises a step of controlling the manufacturing process after each step of testing. The step of testing allows to know the properties and characteristics of the material of the part to be manufactured in the manufacturing phase in which said process is, based on the vibratory response of the part. Then, if the properties and characteristics of the material of the part to be manufactured are not as expected, in the step of controlling the manufacturing process the process can be controlled also using the information of the vibratory response of the part, or even change the control parameters of the additive manufacturing process. In the same way, in said step of controlling the manufacturing process a visual or audible alert can be activated, or even the manufacturing process can be stopped.

In a preferred embodiment of the additive manufacturing method, a support structure for the part to be manufactured is used, so that when creating the mathematical model of the method for non-destructive inspection said support structure is taken into account. That is, the mathematical model that is created in the method for non-destructive inspection describes the dynamic behavior of the set formed by the part to be manufactured and the support structure, taking into account therefore the geometry of the set formed by both, part to be manufactured and support structure, and the properties of the material at the different points of said set.

The support structure used in the additive manufacturing method is configured for adapting to an arrangement of a plurality of excitation sensors and measurement sensors arranged on a table on which the part to be manufactured is positioned. Said plurality of excitation sensors and measurement sensors can be arranged on a table on which the part is to be manufactured. In a preferred embodiment of the manufacturing method additional excitation and measuring sensors could be used, in addition to the sensors arranged on the table. Also, in another embodiment of the manufacturing method, only the additional excitation and measurement sensors could be used, without using therefore the sensors arranged on the table. For this purpose, a tool will be used that allows the excitation of the part at at least one excitation point with an excitation orientation by means of said additional excitation sensor and the measurement of the vibratory response of the part at at least one measurement point and with a measurement orientation by said additional measurement sensor. The tool can be an adaptive and automated tool. In a preferred embodiment, automation would be performed by means of using orientable robot arms.

In a preferred embodiment of the additive manufacturing method, the support structure is a waveguide.

In a preferred embodiment of the additive manufacturing method, the mathematical model of the method for non-destructive inspection takes into account the temperature of the part to be manufactured. During the manufacture of the part, when the material is deposited on a point of the part, said point acquires a high temperature that gradually decreases with time until reaching a stable final temperature, so that the different points of the part are changing their temperature as its manufacture advances. The properties of the material with which the part is being manufactured change also with temperature. Therefore, the mathematical model takes into account the variation of the temperature at the different points of the part to be manufactured to determine the properties of the material at the different points of said part to be manufactured.

The following clauses disclose one or more additional embodiments.

Clause 1. Method for non-destructive inspection of parts for obtaining the properties and characteristics of the material of a part, comprising the following steps:

step of creating a mathematical model describing the dynamic behavior of a part to be inspected taking into account the geometry of the part to be inspected and the properties of the material at the different points of the part to be inspected represented by means of a set of parameters, step of exciting the part to be inspected at at least one excitation point of the part to be inspected and with an excitation orientation, and step of measuring the vibratory response of the part to be inspected at at least one measurement point and with a measurement orientation, the method for inspection further comprises:

a step of optimizing surrounding conditions which is performed after the step of creating the mathematical model, in which the following sub-steps are performed in an iterative manner:

sub-step of selecting surrounding conditions, sub-step of obtaining the modal shapes and associated characteristic values for the surrounding conditions selected in the preceding sub-step, and sub-step of calculating the sensitivity of the characteristic values obtained in the preceding sub-step of the same iteration to the properties and characteristics of the material of the part, for the surrounding conditions selected in the sub-step of selecting surrounding conditions of the same iteration, a step of selecting modal shapes which is performed after the step of optimizing surrounding conditions in which the combinations of surrounding conditions and modal shapes for which the sensitivity of the characteristic values to the properties and characteristics of the material of the part is maximum are selected, and then a step of selecting at least one excitation point with the excitation orientation and at least one measurement point with the measurement orientation depending on the modal shapes selected in the preceding step, the step of exciting the part then being started.

Clause 2. Method for non-destructive inspection of parts according to clause 1, comprising, after the step of measuring, a step of resolving the parameters of the mathematical model in which the properties and characteristics of the material of the part in the entire geometry thereof are obtained depending on the differences between the vibratory response of the part obtained in the step of measuring and the response provided by the validated mathematical model with the same excitation points and excitation orientations, the same measurement points and measurement orientations, and with the same surrounding conditions.

Clause 3. Method for non-destructive inspection according to clause 2, wherein the parameters of the mathematical model represent the mass, stiffness, damping, and/or internal stresses of the material of the part.

Clause 4. Method for non-destructive inspection according to any of the preceding clauses, wherein the surrounding conditions comprise holding the part in a portion of its geometry.

Clause 5. Method for non-destructive inspection according to any of the preceding clauses, wherein the surrounding conditions comprise the application of a force on one or more points of the geometry of the part.

Clause 6. Method for non-destructive inspection according to any of clauses 2 to 5, wherein the mathematical model only resolves the value of one or more of the parameters of the validated mathematical model, considering the value of the rest of the parameters of the validated mathematical model known.

Clause 7. Method for non-destructive inspection according to any of the preceding clauses, comprising, after the step of creating the mathematical model and before the step of optimizing surrounding conditions, a step of adjusting the mathematical model based on empirical data obtained from measurements performed on valid parts, obtaining a validated mathematical model.

Clause 8. Method for non-destructive inspection according to any of the preceding clauses, wherein the surrounding conditions are dynamic conditions.

Clause 9. Method for non-destructive inspection according to any of the preceding clauses, wherein the mathematical model is linear.

Clause 10. Method for non-destructive inspection according to clause 9, wherein the mathematical model is a finite element model.

Clause 11. Method for non-destructive inspection according to clause 9 or 10, wherein the mathematical model describes, by means of a plurality of mathematical equations, the dynamic behavior of the part to be inspected, the mathematical model using a plurality of parameter value matrices, and each parameter value matrix representing one of the properties of the material in the geometry of the part.

Clause 12. Method for non-destructive inspection according to any of the preceding clauses, wherein the excitation used in the step of exciting the part is a frequency sweep which mechanically excites the part in the acoustic range and/or in the ultrasound range.

Clause 13. Additive manufacturing method of a part, characterised in that it comprises at least one step of testing the part to be manufactured in which a method for non-destructive inspection according to any of the preceding clauses is used.

Clause 14. Additive manufacturing method according to clause 13, comprising a plurality of manufacturing phases, the method comprising a step of testing after each manufacturing phase.

Clause 15. Additive manufacturing method according to clause 14, comprising a step of controlling the manufacturing process after each step of testing.

Clause 16. Additive manufacturing method according to any of clauses 13 to 15, wherein a support structure for the part to be manufactured is used, said support structure being taken into account for the creation of the mathematical model of the method for non-destructive inspection.

Clause 17. Additive manufacturing method according to clause 16, wherein the support structure is configured for adapting to an arrangement of a plurality of excitation sensors and measurement sensors arranged on a table on which the part to be manufactured is positioned.

Clause 18. Additive manufacturing method according to clause 17, wherein the support structure is a waveguide.

Clause 19. Additive manufacturing method according to any of clauses 13 to 18, wherein the mathematical model of the method for non-destructive inspection takes into account the temperature of the part to be manufactured.

What is claimed is:

1. A method for non-destructive inspection of a part for obtaining the properties and characteristics of a material of which the part is made, the method comprising:

creating a mathematical model describing a dynamic behavior of the part taking into account a geometry of the part to be inspected and the properties of the material at different points of the part to be inspected, the properties of the material being represented by a set of parameters;

optimizing surrounding conditions after creating the mathematical model, the optimizing surrounding conditions including the following first, second and third steps performed in an iterative manner:

a first step of selecting surrounding conditions;

a second step of obtaining modal shapes and associated characteristic values for the surrounding conditions selected in the first step; and a third step of calculating a sensitivity of the associated characteristic values obtained in the second step of a same iteration to the properties and characteristics of the material of the part, for the one or more surrounding conditions selected in the first step of the same iteration, after optimizing the one or more surrounding conditions, selecting from among the modal shapes obtained in the second step a subset of modal shapes that correspond to the surrounding conditions and the modal shapes for which the sensitivity of the characteristic values to the properties and characteristics of the material of the part is maximum;

selecting at least one excitation point of the part with an excitation orientation and at least one measurement point of the part with a measurement orientation depending on the selected subset of modal shapes;

exciting the part at the at least one excitation point with the excitation orientation; and measuring a vibratory response of the part at the at least one measurement point with the measurement orientation.

2. The method for non-destructive inspection of parts according to claim 1, further comprising after the measuring a vibratory response of the part at the at least one measurement point with the measurement orientation, resolving the set of parameters of the mathematical model in which the properties and characteristics of the material of the part in the entire geometry thereof are obtained depending on the differences between the vibratory response and a response provided by a validated mathematical model with the at least one excitation point with the excitation orientation, and with the at least one measurement point with the measurement orientation, and with the surrounding conditions.

3. The method for non-destructive inspection according to claim 2, wherein the set of parameters of the mathematical model represent one or more of the mass, stiffness, damping, and internal stresses of the material of the part.

4. The method for non-destructive inspection according to claim 2, wherein the mathematical model resolves a value or values of less than all of the parameters of the set of parameters of the validated mathematical model.

5. The method for non-destructive inspection according to claim 4, wherein the values of parameters of the set of parameters of the validated mathematical model not resolved by the mathematical model are known values.

6. The method for non-destructive inspection according to claim 1, wherein the surrounding conditions comprise holding the part in a portion of its geometry.

7. The method for non-destructive inspection according to claim 1, wherein the surrounding conditions comprise the application of a force on one or more of the different points of the geometry of the part.

8. The method for non-destructive inspection according to claim 1, further comprising, after creating the mathematical model and before optimizing surrounding conditions, an adjusting of the mathematical model based on empirical data obtained from measurements performed on valid parts using a validated mathematical model.

9. The method for non-destructive inspection according to claim 1, wherein the surrounding conditions are dynamic conditions.

10. The method for non-destructive inspection according to claim 1, wherein the mathematical model is linear.

11. The method for non-destructive inspection according to claim 10, wherein the mathematical model is a finite element model.

12. The method for non-destructive inspection according to claim 10, wherein the mathematical model describes, by means of a plurality of mathematical equations, a dynamic behavior of the part to be inspected, the mathematical model using a plurality of parameter value matrices, and each of the plurality of parameter value matrices representing one of the properties of the material in the geometry of the part.

13. The method for non-destructive inspection according to claim 1, wherein in the third step a Principal Component Analysis is applied to sensitivities of natural frequencies of the associated characteristic values.

14. The method for non-destructive inspection according to claim 1, wherein the step of exciting the part comprises a frequency sweep which mechanically excites the part in the acoustic range and/or in the ultrasound range.

15. The method for non-destructive inspection according to claim 1, wherein the mathematical model takes into account a temperature of the part.

16. A manufacturing method of the part according to claim 1, the manufacturing method comprising a step of testing the part by use of the method for non-destructive inspection according to claim 1.

17. The manufacturing method according to claim 16, comprising a plurality of manufacturing phases, the manufacturing method comprising the step of testing after each manufacturing phase.

18. The manufacturing method according to claim 17, comprising a step of controlling the manufacturing process after each step of testing.

19. The manufacturing method according to claim 16, wherein the part is supported by a support structure, the support structure being taken into account during the step of testing for the creation of the mathematical model of the method for non-destructive inspection.

20. The manufacturing method according to claim 19, wherein the support structure is configured for adapting to an arrangement of a plurality of excitation sensors and measurement sensors arranged on a table on which the part is positioned.

* * * * *